US008254835B2

(12) United States Patent  
Lee

(10) Patent No.: US 8,254,835 B2
(45) Date of Patent: Aug. 28, 2012

(54) MOBILE TERMINAL WITH NFC FUNCTION

(75) Inventor: Sang Hoon Lee, Seoul (KR)

(73) Assignee: AQ Co., Ltd., Seoul (KR)

( * ) Notice: Subject to any disclaimer, the term of this patent is extended or adjusted under 35 U.S.C. 154(b) by 0 days.

(21) Appl. No.: 13/117,258

(22) Filed: May 27, 2011

(65) Prior Publication Data

US 2012/0129450 A1    May 24, 2012

(30) Foreign Application Priority Data

Nov. 24, 2010    (KR) ......................... 10-2010-0117174

(51) Int. Cl.
*H04B 5/00* (2006.01)
*H04B 7/00* (2006.01)
*H04M 1/66* (2006.01)

(52) U.S. Cl. ................ 455/41.1; 455/41.2; 455/410

(58) Field of Classification Search ................. 455/41.1, 455/41.2, 41.3, 410, 411, 333, 415, 343.3, 455/414.1

See application file for complete search history.

(56) References Cited

U.S. PATENT DOCUMENTS 8,060,012 B2 * 11/2011 Sklovsky et al. ............ 455/41.1
2011/0250839 A1    10/2011 Lee

FOREIGN PATENT DOCUMENTS

| KR | 10-0594271 | B1 | 1/2005 |
| KR | 100594271 | B1 | 6/2006 |
| KR | 10-0911032 | B1 | 8/2009 |
| WO | 2010/114210 | A1 | 10/2010 |

OTHER PUBLICATIONS

English Translation of KR10-0911032.
The Office action from the KR application No. 10-2010-0117174.
English Translation of the Office action from the KR application No. 10-2010-0117174.
English Abstract of KR10-0594271.
Extended European Search Report dated Mar. 21, 2012 for EP 11 16 4828 (which is a patent family of the present application).

* cited by examiner

*Primary Examiner* — Eugene Yun
(74) *Attorney, Agent, or Firm* — The PL Law Group, PLLC

(57) ABSTRACT

Disclosed herein is a mobile terminal with a Near Field Communication (NFC) function, the mobile terminal wirelessly connecting to a reader using NFC. An NFC controller wirelessly connects to the reader through an NFC antenna, and receives an Applet Identification (AID) signal and a function control signal used to control operational states of a plurality of functions provided to the mobile terminal from the reader. A base band unit receives the function control signal, and controls the operational states of functions selected from among the plurality of functions provided to and operated in the mobile terminal. A Universal Integrated Circuit Card (UICC) unit connects to the NFC controller, and records information about the subscriber of the mobile terminal. A Secure Element (SE) encodes and decodes the signal, which is transmitted and received between the mobile terminal and the reader, using a security algorithm.

5 Claims, 9 Drawing Sheets

MOBILE TERMINAL WITH NFC FUNCTION

CROSS-REFERENCE TO RELAYED APPLICATIONS

This application claims priority under 35 U.S.C. §119 to Korean Patent Application No. 10-2010-0117174, filed on Nov. 24, 2010, in the Korean Intellectual Property Office, the disclosure of which is incorporated herein by reference in its entirety.

BACKGROUND OF THE INVENTION

1. Field of the Invention

The present invention relates generally to the control of at least one function of a plurality of functions of a mobile terminal located in a specific area, and, more particularly, to a mobile terminal with a Near Field Communication (NFC) function, which compulsorily controls the operation of one or more functions selected from among functions including a ring tone function, a camera function, a recording function, a scanning function, and a mobile communication function when the mobile terminal with an NFC function is located in a specific area.

2. Description of the Related Art

A mobile communication system includes mobile terminals and a mobile communication network. A mobile terminal is a device which is free to move within a service area formed by a mobile communication network and wirelessly connects to and communicates with a desired counter party whenever and wherever, includes a vehicle mobile terminal and a portable mobile terminal, and will be collectively referred to as a "mobile terminal" below.

Such a mobile terminal generally includes a variety of functions, such as a camera function of capturing still images and video images, a Moving Picture Experts Group (MPEG) Audio Layer-3 (MP3) player function of playing back music files, a recording function of recording and playing back audio signals, a scanning function of copying and recording documents, and an electronic book function of enabling recorded character information to be read, a memo function and data terminal function, in addition to a ring tone function of recognizing the termination and origination of communication and a communication function of wirelessly transmitting/receiving sound and data signals. A mobile terminal has developed into a smart phone (hereinafter regarded as being included in the "mobile terminal") which includes a wireless Internet function, and it is expected that such a trend will continue.

In particular, with the rapid popularization of mobile terminals, almost all people possess a mobile terminal and NFC technology has been applied to such a mobile terminal, so that data can be wirelessly communicated using a small amount of electric power over a short distance.

A method of performing financial payments using such an NFC function like a credit card is referred to as a contactless-type application signal, and means which can process a contactless-type application signal is referred to as smart card means. Recently, it has been normal for mobile terminals to be provided with a smart card function.

There is a case in which such a mobile terminal which includes a variety of functions as described above is possessed and a termination ring tone signal which aurally represents the termination of communication is generated in a place, such as a conference room, a place for education, and a library, where quiet is requested, thereby causing unpleasantness to other people or disturbing the progress of a specific program.

It is necessary that a mobile terminal be operated in silent or etiquette mode in which an aural ring tone is not output in such a limited space (area or zone).

Further, there is a case in which important secret information is captured, recorded, or scanned without permission using the camera, recording and scanning functions of a mobile terminal and is divulged to the outside, or rapidly transmitted to a remote place using a communication function in a place (hereinafter referred to as a "security region"), such as a research laboratory, a development room and a factory, where new technology is researched, developed, and produced by spending a large amount of money.

In order to maintain security in such a security region, it is necessary that the selected specific function of a mobile terminal, such as a camera function, a recording function, a scanning function, a communication function or a termination ring tone function, be automatically controlled such that the corresponding function is not operated.

The related art includes Korean Patent Registration No. 10-0594271 (issued on Jun. 21, 2006) entitled "Mobile Communication Terminal Equipped with Camera and System and Method for Searching for Mobile Communication Terminal Including the same."

FIG. 1 is a diagram illustrating the functional configuration of an apparatus for controlling the function of a mobile terminal according to an embodiment of the related art.

Referring to FIG. 1, the configuration includes a mobile communication terminal 100 and a searching system 10.

The mobile communication terminal 100 performs a mobile communication function in such a way as to wirelessly connect to another mobile terminal in the service area of a mobile communication base station, perform near field communication with a searching system in the service area of an NFC network, and includes a camera 110, a camera function processing module 120, a mobile communication function processing module 130, a camera presence information storage register 140, and an NFC function processing module 150.

The camera 110 captures and outputs an image signal in response to a corresponding control signal. The camera function processing module 120 generates a signal for controlling the capturing, and converts the captured image signal into a digital signal. The mobile communication function processing module 130 wirelessly connects to the mobile communication base station and communicates with the mobile communication base station. The camera presence information storage register 140 records presence information indicative of the presence of the built-in camera 110. The NFC function processing module 150 connects to the searching system 10 using an NFC method, and then transmits information about the presence of the camera 110.

The searching system 10 includes a searching device 200 for performing near field communication, and a display device 300. The searching device 200 connects to the mobile communication terminal 100 using an NFC method, checks whether the camera 110 is present or not, and includes memory 210, a control unit 220, and an NFC function processing module 230.

The memory 210 records a protocol used for communication performed using any one selected from among a Bluetooth method, an NFC method and a wireless Local Area Network (LAN) method. The control unit 220 outputs a control signal to be used to detect the presence of the camera 110, detects the presence of the camera, and then displays the presence of the camera as display data. The NFC function processing module 230 wirelessly communicates with the mobile communication terminal 100 over a short distance.

The display device 300 receives a signal obtained in such a way that the control unit 220 detects the presence of the camera 110 and outputs the presence of the camera 110 as display data, and displays the signal using an alarm lamp, a sound, or a text message.

In the configuration of the related art, the searching device 200 wirelessly connects to the mobile communication terminal 100 over a short distance using NFC and receives and analyzes the information about the presence of the camera, thereby determining whether the camera 110 is provided or not.

If the searching device 200 determines that the camera 110 is present in the mobile communication terminal 100, the searching device 200 generates an alarm signal in the display device 300 so that an operator can be aware of the alarm signal.

The operator who is aware of the alarm signal manually takes necessary measures against a user who possesses the mobile communication terminal 100 with the built-in camera 110.

When the mobile terminal includes a camera presence information storage register and does not provide information about the presence of the camera to the searching device, the related art has a problem in that the searching device cannot check whether the mobile terminal includes a camera function.

Meanwhile, the mobile terminal separately includes the register, and records and provides the information about the presence of a camera, so that the related art has problems in that the configuration thereof is complicated, the price thereof is high, and the manufacturing and production processes thereof are complicated.

Furthermore, even when measures are taken to prevent the camera function of the mobile terminal from being used in a security region, secret information may be recorded or transmitted and relayed to a remote place using another function, such as the recording function or the mobile communication function, so that the related art has a problem in that the leakage of information cannot be fundamentally and automatically prevented.

Moreover, the related art has a problem in that the operations of a camera function and some other function, such as a termination ring tone function, a communication function or a recording function, cannot be automatically controlled at the same time in the security region.

Therefore, it is necessary to develop technology for connecting to a mobile terminal in a security region using an NFC method, automatically controlling the activation and operation of a selected function, such as a termination ring tone function, a mobile communication function, a camera function or a recording function, enabling configuration to be simple and the price thereof to be low without providing a separate register, and enabling manufacturing and producing processes to be simple, thereby improving productivity.

SUMMARY OF THE INVENTION

Accordingly, the present invention has been made keeping in mind the above problems occurring in the prior art, and an object of the present invention is to provide an apparatus for controlling the function of a mobile terminal using NFC, which automatically controls the activation and operation of one or more selected functions, such as a ring tone function, a camera function, a recording function, and/or a mobile communication function, of a mobile terminal which is connected using NFC in a designated security region.

In order to accomplish one or more of the above object, the present invention provides a mobile terminal with a Near Field Communication (NFC) function, the mobile terminal wirelessly connecting to a reader using an NFC method, including: an NFC antenna transmitting and receiving signals; an NFC controller for wirelessly connecting to the reader through an NFC antenna, and receiving an Applet Identification (AID) signal and a function control signal used to control the operational states of a plurality of functions provided to the mobile terminal from the reader; a base band unit for receiving the function control signal, and controlling the operational states of one or more functions selected from among the plurality of functions provided to and operated in the mobile terminal; a Universal Integrated Circuit Card (UICC) unit for connecting to the NFC controller, and recording information about the subscriber of the mobile terminal; and a Secure Element (SE) for encoding and decoding the signal, which is transmitted and received between the mobile terminal and the reader, using a security algorithm.

According to an embodiment of the present invention, the NFC controller checks a location in which an applet has been recorded using the AID, activates the applet corresponding to the checked location, encodes the received function control signal, and transmits the encoded function control signal to the activated applet.

According to an embodiment of the present invention, the base band unit includes: a card applet unit for setting an applet corresponding to the AID received from the reader by the NFC controller to an active state, receiving the function control signal, and converting the function control signal into a decoded function control signal by decoding an encryption code; and a function control unit for controlling the operational states of the functions designated based on the function control signal decoded and transmitted by the card applet unit.

According to an embodiment of the present invention, the base band unit includes a function control unit for controlling the operational states of the functions designated based on the function control signal decoded and transmitted from the NFC controller; and the UICC unit includes a card applet unit for setting an applet recorded to an active state under a control of the NFC controller, receiving the function control signal, and converting the function control signal into a decoded function control signal by decoding an encryption code.

According to an embodiment of the present invention, the base band unit includes a function control unit for controlling the operational states of the functions designated based on the function control signal decoded and transmitted from the NFC controller, and the SE includes a card applet unit for setting an applet recorded under a control of the NFC controller in an active state, receiving the function control signal, and converting the function control signal into a decoded function control signal by decoding an encryption code.

According to an embodiment of the present invention, the base band unit includes a function control unit to control the operational states of the functions designated based on the function control signal decoded and transmitted from the NFC controller, and the NFC controller includes a card applet unit to set an applet recorded under a control of the NFC controller in an active state, receive the function control signal, and convert the function control signal into a decoded function control signal by decoding an encryption code.

According to another aspect of the present invention, a mobile terminal with an NFC function, the mobile terminal wirelessly connecting to a reader using an NFC method, including: an NFC controller for wirelessly connecting to the reader through an NFC antenna, and receiving an Applet Identification (AID) signal and a function control signal used to control the operational states of a plurality of functions provided to the mobile terminal from the reader; a base band unit for receiving the function control signal, and controlling operational states of one or more functions selected from among the plurality of functions provided to and operated in the mobile terminal; and a Universal Integrated Circuit Card (UICC) unit for connecting to the NFC controller and recording information about a subscriber of the mobile terminal; wherein the NFC controller includes an SE for encoding and decoding the signal, which is transmitted and received between the mobile terminal and the reader, using a security algorithm; and wherein the SE includes a card applet unit for setting an applet recorded to an active state under a control of the NFC controller, receiving the function control signal, and converting the function control signal into a decoded function control signal by decoding an encryption code.

According to yet another aspect of the present invention, a mobile terminal with a Near Field Communication (NFC) function, the mobile terminal wirelessly connecting to a reader using an NFC method, including: an NFC antenna transmitting and receiving signals; an NFC controller to wirelessly connect to the reader through the NFC antenna and to receive an Applet Identification (AID) signal and a function control signal used to control operational states of a plurality of functions provided to the mobile terminal from the reader; a base band unit to receive the function control signal and control the operational states of at least one function selected from among the plurality of functions provided to and operated in the mobile terminal; a Universal Integrated Circuit Card (UICC) unit to connect to the NFC controller and record information about a subscriber of the mobile terminal; a Secure Element (SE) to encode and decode the signal transmitted and received between the mobile terminal and the reader, using a security algorithm; and a card applet unit to set an applet recorded to an active state under a control of the NFC controller, receive the function control signal, and convert the function control signal into a decoded function control signal by decoding an encryption code, the card applet unit being included in one of the base band unit, the Universal Integrated Circuit Card (UICC), the Secure Element (SE) and the NFC controller.

The operational states of the functions designated based on the function control signal may be the operational states of a ring tone, an image capturing, recording, scanning, a mobile communication or a combination thereof.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
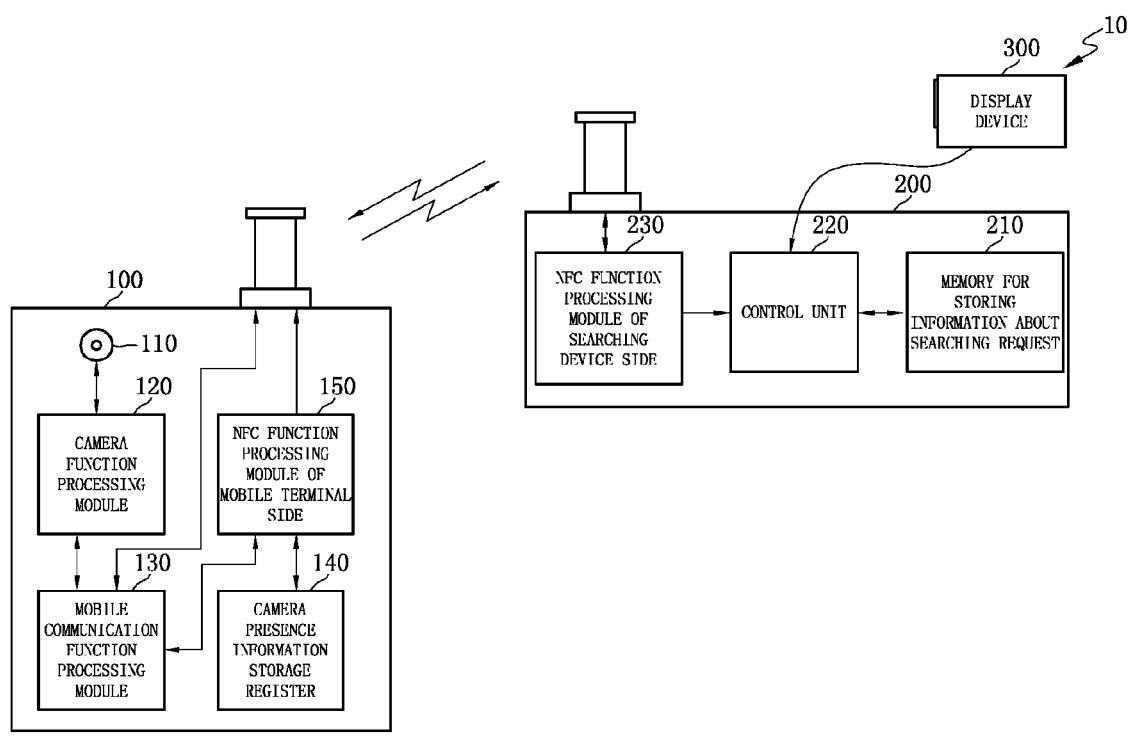
FIG. 1 is a diagram illustrating the functional configuration of an apparatus for controlling the function of a mobile terminal according to an embodiment of the related art.

Terms and words used in the present specification and claims must not be interpreted as having common and dictionary meanings, but should be interpreted as having meanings and concepts in conformity with the technical spirit of the present invention based on the principle according to which an inventor can appropriately define the concepts denoted by terms in order to describe the inventor's own invention in the most appropriate way. When it is determined that the detailed descriptions and drawing of well-known functions and configurations would obscure the gist of the present invention, they will be omitted below.

NFC requires small power consumption because communication is performed within a short distance of for example, about 10 cm using a radio frequency of 13.56 MHz, performs data communication at a maximum of 424 Kbps, is compatible with a contactless-type Radio Frequency Identification (RFID) technology, and operates using any one of the active and passive communication modes.

The active communication mode of the NFC allows each of a transmission side and a reception side to consume operational power by themselves, to generate wireless signals and then to transmit data to counter parties, while the passive communication mode allows, when the transmission side generates a wireless signal, the reception side to receive the wireless signal, convert the wireless signal into operational power, analyze the received wireless signal based on the operational power, and respond to an analyzed command, so that the reception side does not include a separate power source.

A mobile terminal with an NFC function wirelessly connects to and communicates with a reader located within a short distance of about 10 cm, activates an applet which is selected and designated such that data format is the same, under the control of the reader, and adds a security signal to the data format which is transmitted and received therebetween, thereby preventing illegal leakage to another person and, simultaneously, authenticating each other.

The addition and separation of such a security signal to and from the data format to be transmitted and received perform a security process in such a way that a provided security algorithm is activated by a Security Element (SE) in the case of the mobile terminal, and that a provided security algorithm is activated by a Sequential Access Method (SAM) in the case of the reader, that is, encoding and decoding processes are performed on a signal to be transmitted and received using the NFC method.

The mobile terminal includes detachable memory which stores personal information about a user, financial information required for a payment, the telephone number and serial number of the mobile terminal, information about a phonebook, and application programs. Such detachable memory is called a Universal Subscriber Identity Module (USIM).

As a smart card function of recording and outputting information which is used to process a contactless-type application signal is added to such a USIM, the USIM is called a Universal Integrated Circuit Card (UICC). Although a UICC has a capacity of hundreds of kilobytes, the capacity may be further increased.

Generally, the chip for processing a base band signal, UICC and SE of the mobile terminal, and the SAM of the reader sufficiently include a memory area for recording information about self-operation and a memory area for recording various applets including a card mode applet.

In the present invention, functions included in a general mobile terminal and selectively activated and operated, that is, functions including the mobile communication function, the camera function, the recording and reproducing function, the scanning function, the ring tone function, the MP3 function and the wireless Internet access function in an embodiment, will be described as "functions."

Further, the data format of a contactless-type application signal used to make financial payment for commercial transactions in an application field, such as a theater, a bookstore, or a shopping center, is generally different from that of a contactless-type application signal used to make payment for transportation expenses in an application field of transportation means, such as a bus or a subway.

Such a data format may be divided into a card mode in which electronic payment attributable to financial transactions is processed, a reader mode in which one-to-one wireless communication is performed, and a tag mode in which only written data is read.

Further, in the case of the card mode which is applied to electronic payments, data about financial transactions using transportation means is based on a process and calculation method of increasing the fare in proportion to the distance, and data about financial transactions attributable to article transactions is based on a method of calculating a predetermined price. Accordingly, the data formats of the financial transaction data are different from each other.

An application program for distinguishing between data formats which are different from each other is called an applet. An applet operated in the card mode is called a card mode applet, an applet operated in the reader mode is called a reader mode applet, and an applet operated in the tag mode is called a tag mode applet.

Therefore, when a mobile terminal is used as a smart card, it should include all of the different applets that are applied to respective application fields.

Further, when service providers are different from each other, the service providers providing services of processing the same contactless-type application signals in the same application field, constructing dedicated networks and managing businesses, security signals are added to the respective data formats in order to protect information about clients and transactions and maintain security. In this case, applets being operated are generally different from each other in this case.

Therefore, there may be very many kinds of applets, and each of the applets is distinguished by applet Application ID (hereinafter referred to as "AID").

As an example, service providers which construct networks and provide services in Korea include T-money, an EB card, a mybi card, and a hanaro card.

In the present invention, means which includes a function of processing a contactless-type application signal will be described as smart card means.

In the present invention, Over The Air (OTA) will be described as a method of providing various kinds of data, application programs, and information using a wireless network in a download manner.

In the description of the present invention, setting one or more functions selected from among a plurality of functions provided to a mobile terminal so that the function is in either an on or off state will be described as activation control, and the two states will be also used when clear description is required.

Figure 2:
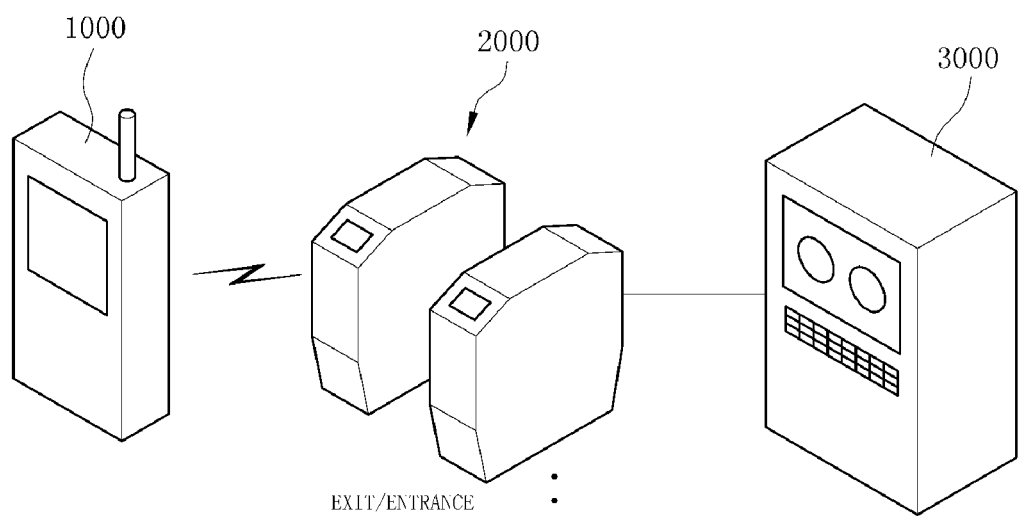
FIG. 2 is a diagram illustrating the functional configuration of a security region management system according to a first embodiment of the present invention.

FIG. 2 is a diagram illustrating the functional configuration of a security region management system according to a first embodiment of the present invention.

Referring to FIG. 2, a security region management system includes a mobile terminal 1000, a reader 2000, and a server 3000.

The mobile terminal 1000 performs mobile communication in such a way as to wirelessly connect to a mobile communication base station and to wirelessly connect to a desired counter party while freely moving within a corresponding service area, and also performs near field communication at a radio frequency of 13.56 MHz using an NFC method.

Although mobile communication was developed chiefly to transmit and receive voice-grade signals, it has been developed such that data signals can be transmitted and received. Although NFC is a technology which was developed to establish a wireless connection over a short distance of about 10 cm and perform data communication, the application fields thereof may be continuously expanded.

Wireless communication using the NFC method has been frequently used in an application field of processing a contactless-type application signal like in a credit card used in a mart, a restaurant, a bookstore and a department store, and in an application field of processing a contactless-type application signal like in the payment of the transportation expenses of a bus and a subway, and generally called a smart card.

One of the technical spirits of the present invention is to determine the activation of a function selected from among a plurality of functions provided to a mobile terminal and compulsorily control the corresponding function using wireless communication via the NFC method. Here, the activation of a function includes the operation of the corresponding function in either an on or off state, and will be applied in the same manner below.

The reader 2000 is installed at an entrance where entrance to and exit from an excluded security region is permitted, and is configured to wirelessly connect to the mobile terminal 1000 over a short distance within about 10 cm using the NFC method, and is configured to transmit a function control signal used to control the activation of at least one function selected from among the plurality of functions provided to the mobile terminal 1000.

The security region includes places, such as a business center, a market, a classroom, a library, a conference room, a theater, a laboratory, a factory, and a secret treatment place, where various kinds of services are provided.

Such a security region generally includes public places where other people should not be bothered by the generation of noise, a place where secret information that cannot be exposed to the third party is treated for a variety of purposes, and a place where facilities which require security are operated and managed.

A plurality of readers 2000 are needed to be provided when the security region is wide, and the reader 2000 is needed to be separately provided for each security region when there are a plurality of security regions and the security regions are separately located.

The mobile terminal 1000 may include a ring tone generation function, a camera capturing function, a recorder function, a scanning function, and/or an MP3 player function, in addition to a mobile communication function, and a computer function has been developed and continuously added to the mobile terminal 1000. Although smart phones with a wireless Internet function have been recently introduced, they are all included in the mobile terminal 1000, and each of the functions will be described as any one of the plurality of functions provided to the mobile terminal 1000 below.

The server 3000 connects to the reader 2000 and records and manages security information by putting the security information into a database. In the case where there is a plurality of readers 2000, the server 30000 connects to each of the readers and intensively manages collected security information, and can integrate and control such information.

Figure 3:
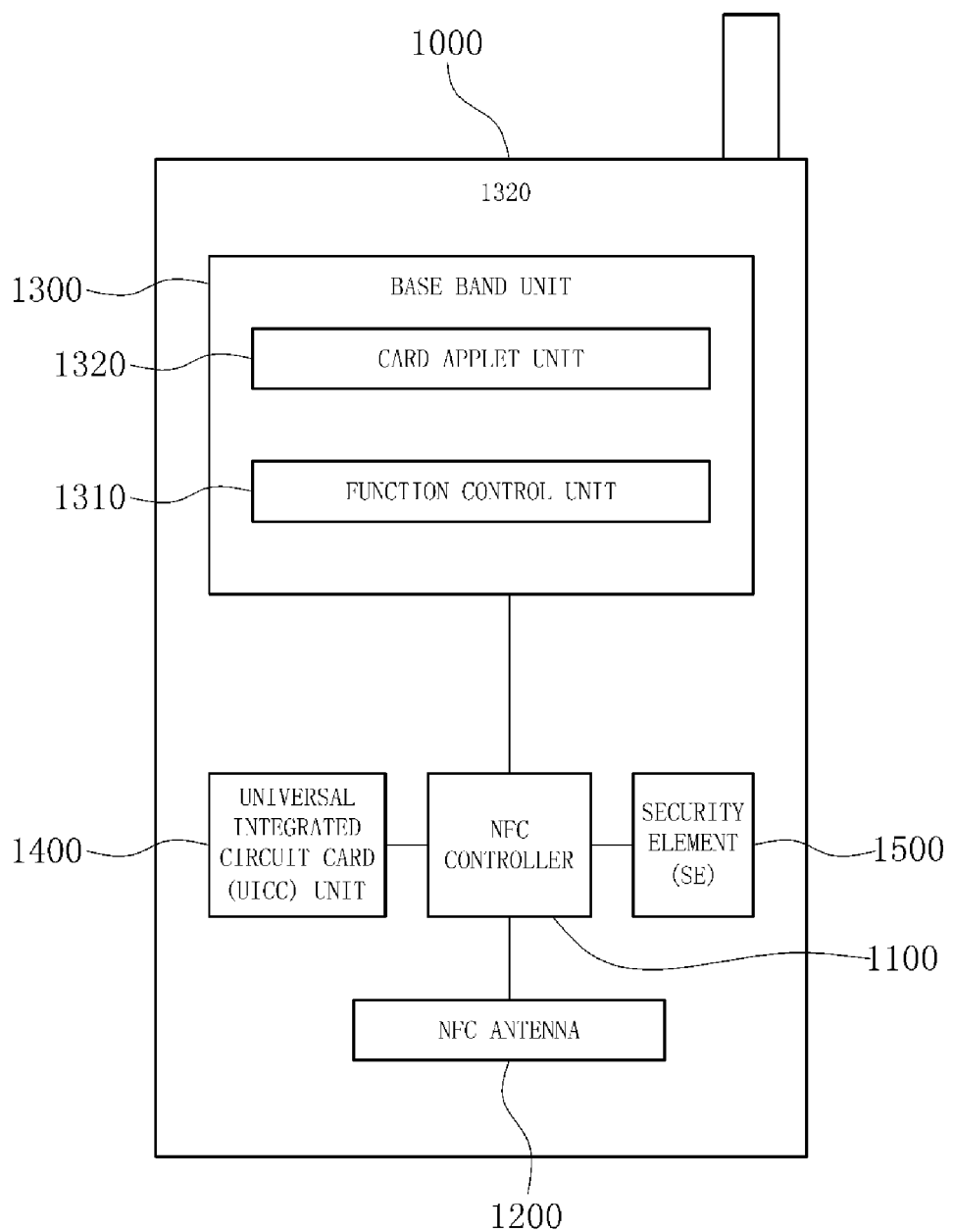
FIG. 3 is a diagram illustrating the functional configuration of a mobile terminal with an NFC communication function according to the first embodiment of the present invention.

FIG. 3 is a diagram illustrating the functional configuration of the mobile terminal with an NFC communication function according to the first embodiment of the present invention.

Referring to FIG. 3, the mobile terminal 1000 includes an NFC controller 1100, an NFC antenna 1200, a base band unit 1300, a UICC unit 1400, and a security element (SE) 1500.

A power unit for supplying operational power is a general one and it is desirable to describe the present invention simply and clearly, so that the power unit is not shown in the drawing and not described.

The mobile terminal 1000 wirelessly connects to a base station in a service area formed by the mobile communication base station, thereby wirelessly communicating with a selected counter party.

Mobile communication base stations form a service area having a predetermined radius, and a plurality of base stations are repeatedly established at predetermined intervals of distance, thereby enabling wireless connection to a desired counter party and the transmittance and reception of communication signals in an area which is covered by the plurality of base stations.

The NFC controller 1100 wirelessly connects to the reader 2000 using the NFC method through the NFC antenna 1200 which resonates with a radio frequency of 13.56 MHz according to an embodiment of the present invention. Here, the NFC antenna 1200 is tuned so as to wirelessly connect to the frequency of 13.56 MHz and configured to wirelessly transmit and receive communication signals in conformity with the NFC method.

The NFC controller 1100 activates a card mode applet capable of receiving a function control signal based on the AID from the reader 2000, receives the function control signal used to perform control such that any one or more functions selected from among the plurality of functions provided to the mobile terminal 1000 are turned on or off, encodes the function control signal, and transmits the encoded function control signal to the base band unit 1300.

The NFC controller 1100 receives the AID used to designate the recording location of the card mode applet capable of performing wireless connection in an authenticated state and receiving the function control signal from the reader 2000, rapidly searches for the location of the card mode applet based on the received AID, and sets the card mode applet to an active state.

To explain differently, the NFC controller 1100 encodes the received AID and transmits the encoded AID to a card applet unit 1320, and the card applet unit 1320 performs a decoding process for decoding the encryption code, and then the NFC controller 1100 checks the location where the card mode applet is recorded based on the decoded AID and activates the card mode applet.

Here, the activated card mode applet is an application program which enables the NFC controller 1100 of the mobile terminal 1000 to receive the function control signal transmitted from the reader 2000 when the mobile terminal 1000 and the reader 2000 are authenticated by each other, and such a card mode applet will be applied in the same manner below.

The NFC controller 1100 encodes the function control signal received from the reader 2000 which is connected in an authenticated state, and transmits the encoded function control signal to the card applet unit 1320 of the base band unit 1300. The card applet unit 1320 detects the function control signal by performing a decoding process for decoding the encryption code.

The base band unit 1300 includes a function control unit 1310 and the card applet unit 1320, and processes the base band signal of the mobile terminal 1000. The base band unit 1300 receives the encoded function control signal from the NFC controller 1100, decodes the function control signal, and transmits the decoded function control signal to the function control unit 1310.

The function control unit 1310 analyzes the function control signal transmitted from the card applet unit 1320 and controls the activation of a function designated or selected from among the plurality of functions provided to the mobile terminal 1000.

The function control signal is used to control activation of the corresponding function, that is, to turn on or turn off the function.

Functions operated in the mobile terminal include a mobile communication function, a ring tone generation function, a camera capturing function, a recorder function, an MP3 player function, a scanning function, a computer function, and a wireless Internet function.

Here, the reader 2000 may be operated as the entrance and exit of a security region. In this case, when entering the security region while passing through the reader 2000, the designated function of the mobile terminal 1000 may be compulsorily controlled so that the function is turned off in order to prevent the designated function of the mobile terminal from being activated and operated normally.

Further, when leaving the security region while passing through the reader 2000 which is operated as the entrance and exit, the designated function of the mobile terminal 1000 may be compulsorily controlled so that the function is turned on such that the designated function of the mobile is activated and operated.

The UICC unit 1400 includes a USIM card function of recording phone numbers, the serial number of a mobile terminal device, personal information and financial information about a user, and phone book information in order for the mobile terminal 1000 to use a mobile communication service under the control of the NFC controller 1100, and records information generated when the mobile terminal 1000 processes the contactless-type application signal operated in the form of a smart card.

The contactless-type application signal is a signal including the serial number of a smart card, AID, and personal information and financial information about a mobile terminal user.

The UICC unit 1400 includes memory having a comparatively large capacity of hundreds of kilobytes, so that other application programs or applets can be added and recorded therein.

The security element (SE) 1500 activates a security algorithm recorded therein under the control of the NFC controller 1100, and performs an encoding process of adding a security signal, having a format which can be recognized by the reader 2000, to a signal transmitted to the reader 2000.

Further, the SE 1500 performs a decoding process of separating the security signal from a signal received from the reader 2000.

Therefore, the SE 1500 adds or separates a security signal to or from the data format of a signal to be transmitted or received, thereby preventing transmission errors from occurring and information from leaking out due to another device.

Meanwhile, the mobile terminal 1000 and the reader 2000 can authenticate with each other using such a security signal.

Figure 4:
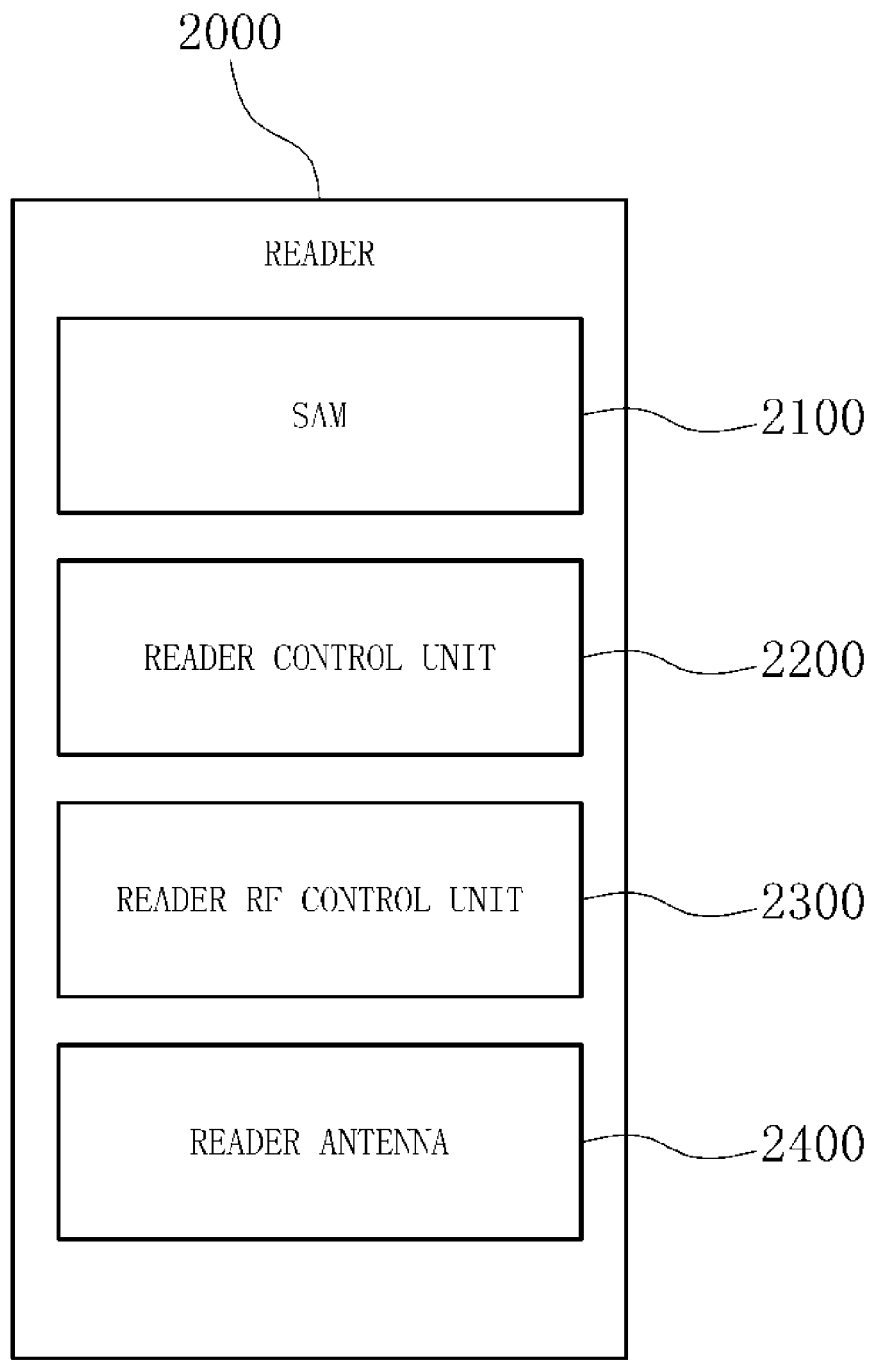
FIG. 4 is a diagram illustrating the functional configuration of a reader with a Radio Frequency (RF) communication function according to the first embodiment of the present invention.

FIG. 4 is a diagram illustrating the functional configuration of the reader with an RF communication function according to the first embodiment of the present invention.

Referring to FIG. 4, the reader 2000 wirelessly connects to the mobile terminal using the NFC method or an RFID method, outputs a function control signal used to compulsorily control the activation of at least one function selected from among the plurality of functions provided to the mobile terminal 1000, that is, turning on or turning off the selected functions, and includes a SAM 2100, a reader control unit 2200, a reader RF control unit 2300, and a reader antenna 2400.

Further, the reader 2000 transmits AID which enables the mobile terminal 1000 to be operated as a smart card to the mobile terminal 1000.

The sequential access method (SAM) 2100 performs a function which is the same as or similar to that of the SE 1500 of the mobile terminal 1000, and adds a security signal to a signal to be transmitted or separating a security signal from a received signal.

Such a security signal is used to authenticate counter parties and to reject communication with a counter party which is not authenticated. That is, communication, requested by a counter party which is not authenticated because security signals are different from each other, is not realized.

Therefore, the SAM 2100 prevents data transmission errors and authenticates the counter party while preventing data format to be transmitted or received from leaking out to other devices, like the SE 1500.

The reader control unit 2200 controls and monitors the overall operation of the reader 2000 and can communicate with the server 3000 if necessary.

The reader RF control unit 2300 has a configuration which is the same as or similar to that of the NFC controller 1100 of the mobile terminal 1000, and the reader antenna 2400 has a configuration which is the same as or similar to that of the NFC antenna 1200 of the mobile terminal 1000, so that the duplicate description thereof will be omitted.

Figure 5:
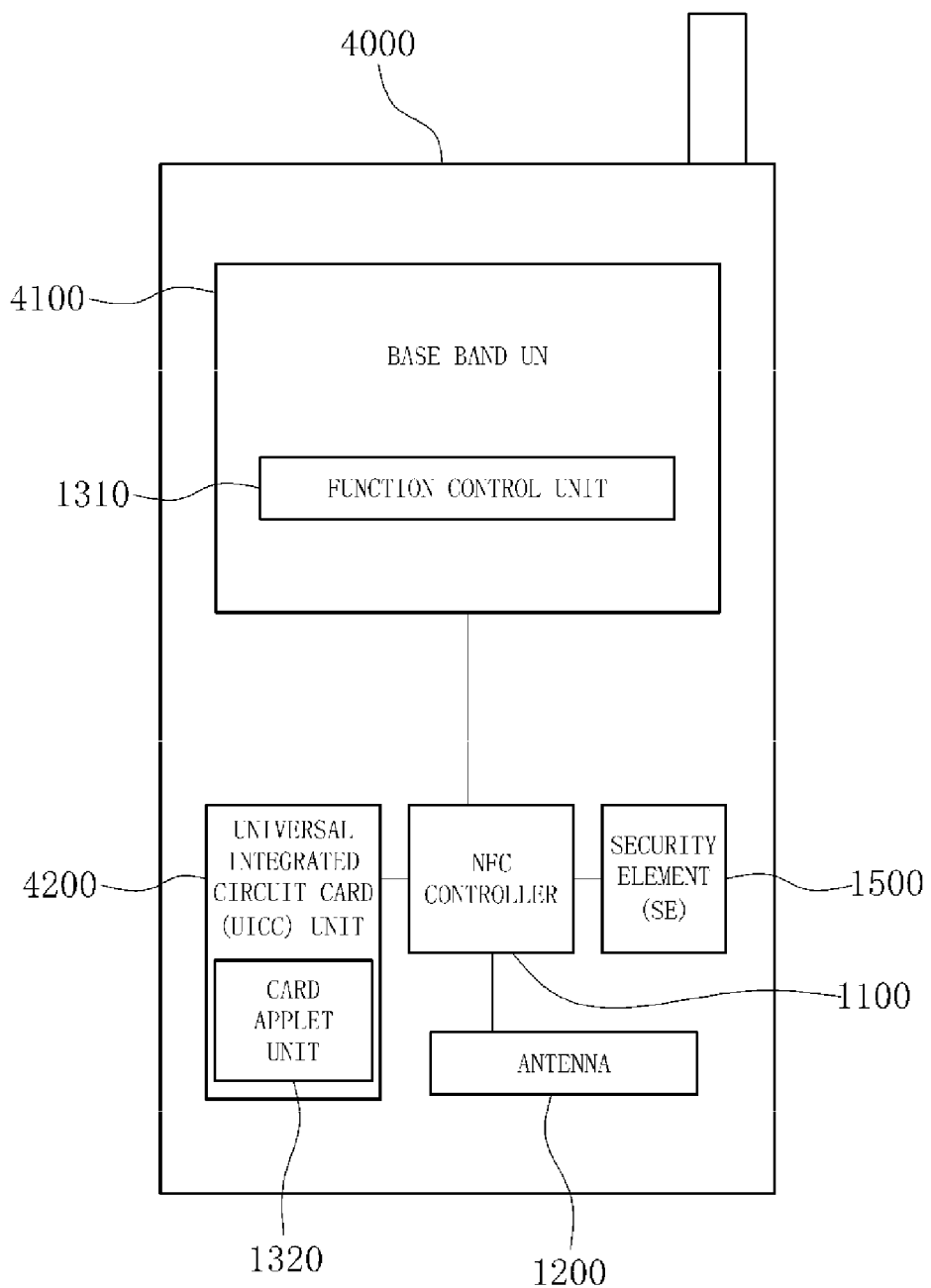
FIG. 5 is a diagram illustrating the functional configuration of a mobile terminal with the NFC communication function according to a second embodiment of the present invention.
Figure 6:
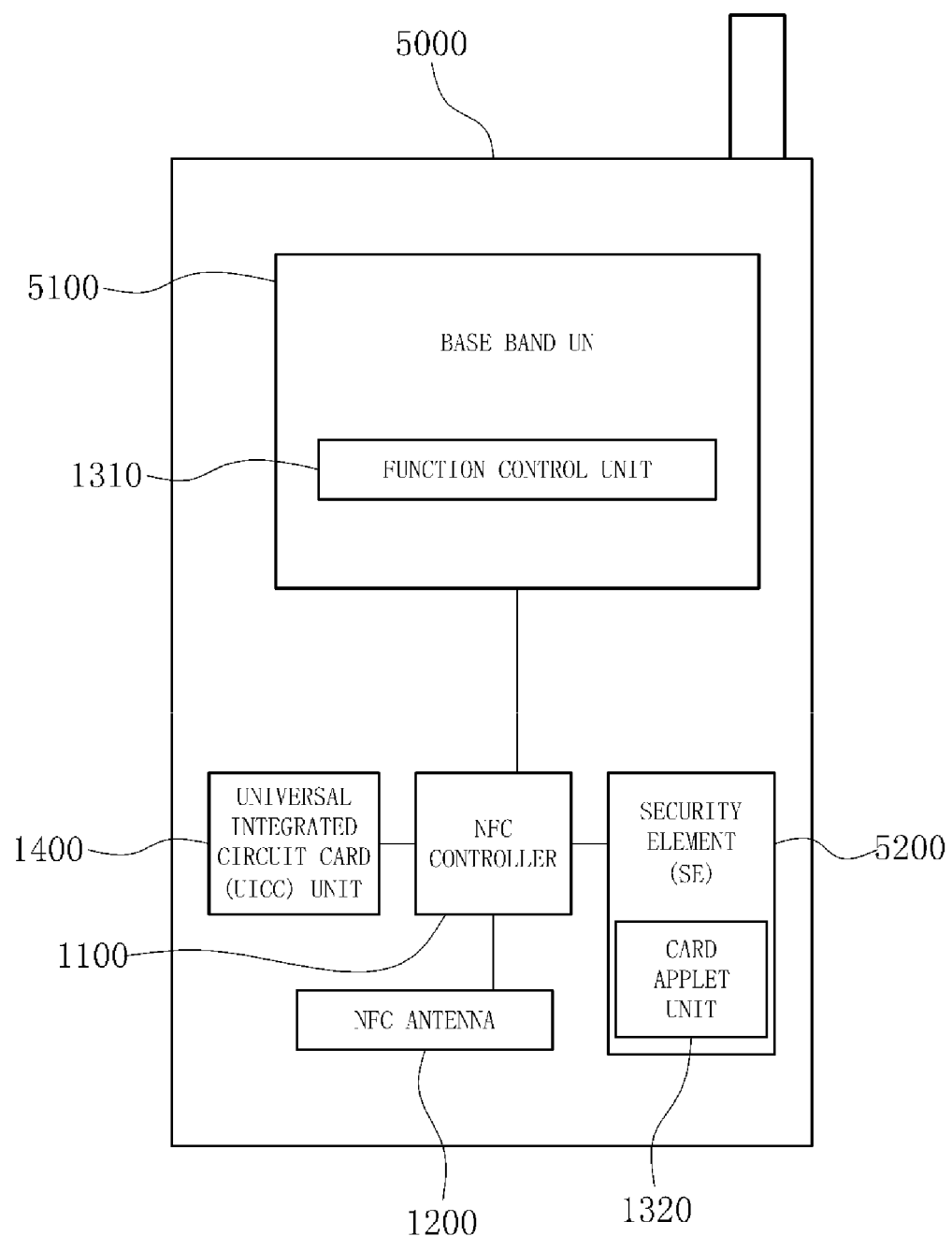
FIG. 6 is a diagram illustrating the functional configuration of a mobile terminal with the NFC communication function according to a third embodiment of the present invention.
Figure 7:
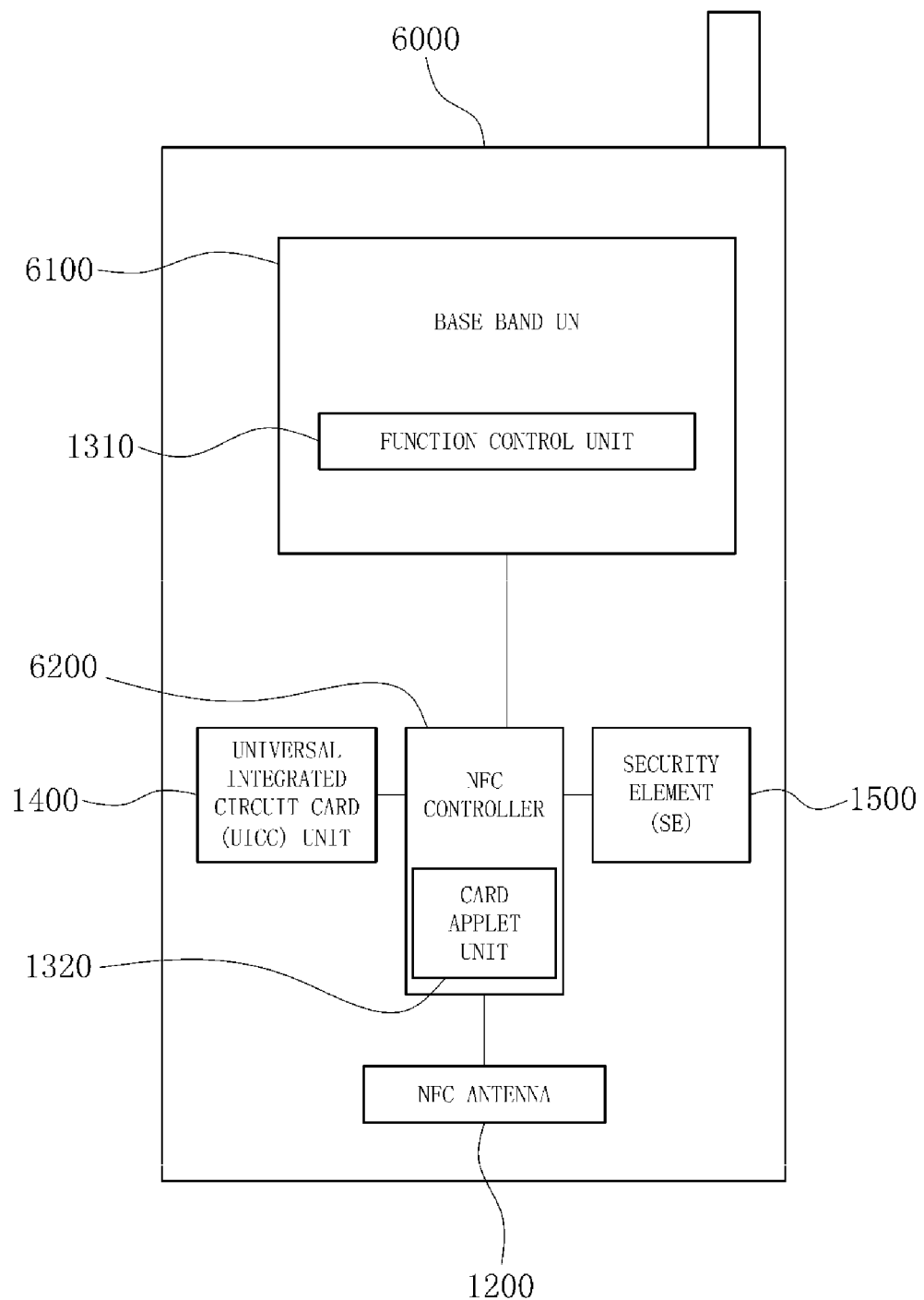
FIG. 7 is a diagram illustrating the functional configuration of a mobile terminal with the NFC communication function according to a fourth embodiment of the present invention.

FIG. 5 is a diagram illustrating the functional configuration of a mobile terminal with the NFC communication function according to a second embodiment of the present invention, FIG. 6 is a diagram illustrating the functional configuration of a mobile terminal with the NFC communication function according to a third embodiment of the present invention, and FIG. 7 is a diagram illustrating the functional configuration of a mobile terminal with the NFC communication function according to a fourth embodiment of the present invention.

Referring to FIGS. 5 to 7, there are differences in that a mobile terminal 4000 according to a second embodiment shown in FIG. 5 configures a card applet unit 1320 included in a UICC unit 4200, and a mobile terminal 5000 according to a third embodiment shown in FIG. 6 configures a card applet unit 1320 included in an SE 5200, and a mobile terminal 6000 according to a fourth embodiment shown in FIG. 7 configures a card applet unit 1320 included in an NFC controller unit 6200.

The duplicate description of the configuration which is the same as that of the mobile terminal 1000 according to the first embodiment shown in the accompanying FIG. 3 will be omitted.

In the mobile terminal 4000 according to the second embodiment shown in the accompanying FIG. 5, a base band unit 4100 includes a function control unit 1310, and the UICC unit 4200 further includes the card applet unit 1320.

An NFC controller unit 1100 according to the second embodiment shown in the accompanying FIG. 5 receives AID transmitted from the reader 2000 and transmits the AID to the UICC unit 4200.

The card applet unit 1320 included in the UICC unit 4200 sets an applet designated by the AID transmitted from the NFC controller unit 1100 to an active state, so that a card mode applet, which is an application program capable of wirelessly connecting to the reader 2000 in an authenticated state and receiving a function control signal, can be activated.

In such a state, the NFC controller 1100 which received a function control signal from the reader 2000 encodes the function control signal and transmits the encoded function control signal to the card applet unit 1320 of the UICC unit 4200.

The card applet unit 1320 detects and decodes the function control signal received from the NFC controller 1100 using the activated card mode applet, and then transmits the decoded signal to the function control unit 1310 of the base band unit 4100 through the NFC controller 1100.

The function control unit 1310 performs control so that one or more functions selected from among a plurality of functions provided to the mobile terminal 4000 are turned on or off in response to the received function control signal.

In the mobile terminal 5000 according to the third embodiment shown in the accompanying FIG. 6, a base band unit 5100 includes a function control unit 1310, and an SE 5200 further includes the card applet unit 1320.

The NFC controller unit 1100 according to the third embodiment shown in the accompanying FIG. 6 receives the AID transmitted from the reader 2000 and transmits the AID to an SE 5200.

The card applet unit 1320 included in the UICC unit 5200 sets a card mode applet designated by the AID transmitted from the NFC controller unit 1100 to an active state, so that an applet, which is an application program capable of wirelessly connecting to the reader 2000 in an authenticated state and receiving a function control signal, may be activated.

In such a state, the NFC controller 1100 which received a function control signal from the reader 2000 encodes the function control signal and transmits the encoded function control signal to the card applet unit 1320 of the SE 5200.

The card applet unit 1320 detects and decodes the function control signal received from the NFC controller 1100 using the activated card mode applet, and then transmits the decoded signal to the function control unit 1310 of the base band unit 5100 through the NFC controller 1100.

The function control unit 1310 performs control so that one or more functions selected from among the plurality of functions provided to the mobile terminal 5000 are turned on or off in response to the received function control signal.

In the mobile terminal 6000 according to the fourth embodiment shown in the accompanying FIG. 7, a base band unit 6100 includes a function control unit 1310, and an NFC controller 6200 further includes the card applet unit 1320.

The NFC controller unit 1100 according to the fourth embodiment shown in the accompanying FIG. 7 activates the designated card mode applet of the card applet unit 1320 based on the AID transmitted from the reader 2000, thereby connecting to the reader 2000 in an authenticated state and receiving the function control signal.

The function control signal received from the reader 2000 is transmitted to the card applet unit 1320, so that the function control signal is detected by the activated card mode applet and the detected function control signal is transmitted to the function control unit 1310 of the base band unit 6100 through the NFC controller 1100.

The function control unit 1310 performs control so that one or more functions selected from among a plurality of functions provided to the mobile terminal 6000 is turned on or off.

According to the configuration of the present invention, the reader 2000 can be wirelessly connected in an authenticated state and the function control signal can be received based on the AID provided from the reader 2000, and one or more specific functions of the mobile terminal are turned on or off in response to the received function control signal.

That is, there is an advantage in that control is performed on one or more functions selected from among the plurality of functions of the mobile terminal, so that the selected functions are turned on or off in response to the function control signal received from the reader.

Figure 8:
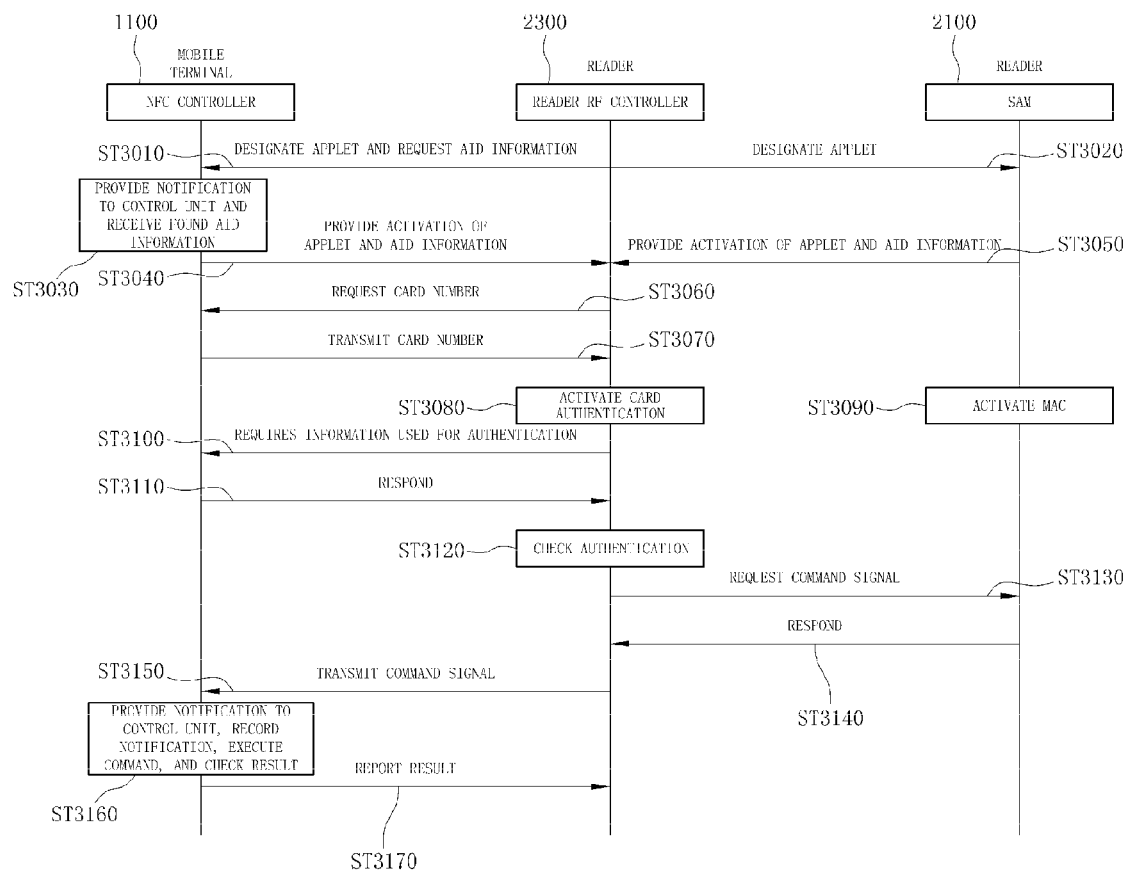
FIG. 8 is a view illustrating the flows of control signals between the mobile terminal and the reader according to the first embodiment of the present invention.

FIG. 8 is a view illustrating the flow of the control signals between the mobile terminal and the reader according to an embodiment of the present invention.

Hereinafter, when described in detail with reference to the accompanying drawing, if the reader RF control unit 2300 of the reader 2000 detects the radio signal of the mobile terminal 1000 using the NFC method, the reader RF control unit 2300 transmits a function control signal used to designate an applet to be activated and to request AID from the mobile terminal 1000 (ST3010).

Here, the reader RF control unit 2300 transmits to the SAM 2100 a function control signal used to designate a card mode applet to be activated at the same time (ST3020).

The NFC controller 1100 of the mobile terminal 1000 receives and analyzes the function control signal transmitted from the reader 2000, and transmits the function control signal to the card applet unit 1320 of the base band unit 1300. The base band unit 1300 performs control such that the designated applet is activated, and then transmits the detected AID and an activation state to the NFC controller 1100 (ST3030).

The NFC controller 1100 wirelessly transmits the activation state of the designated card mode applet and the detected AID to the reader 2000, thereby transmitting them to the reader RF control unit 2300 (ST3040).

Here, the SAM 2100 activates the designated card mode applet and reports the activation state to the reader RF control unit 2300 (ST3050).

The reader RF control unit 2300 of the reader 2000 transmits a function control signal used to request the serial number of a smart card to the mobile terminal 1000 (ST3060), and the NFC controller 1100 wirelessly receives the function control signal and provides notification to the base band unit 1300, receives the serial number of the smart card, and wirelessly transmits the serial number to the reader RF control unit 2300 of the reader 2000 (ST3070).

The reader RF control unit 2300 of the reader 2000 activates a card authentication function (ST3080) and requests the information used for smart card authentication from the mobile terminal 1000 (ST3100). The NFC controller 1100 responds to the request by transmitting the information used for the smart card authentication provided from the base band unit (ST3110).

Here, the SAM 2100 activates Mac which is an operating program (ST3090), and the reader RF control unit 2300 authenticates the smart card (ST3120).

The information used for the smart card authentication generally includes a corresponding serial number, an available expiration date, and a password.

The reader RF control unit 2300 of the reader 2000 requests a function control signal which provides notification that the activation of one or more functions of the mobile terminal 1000 should be controlled from the SAM 2100 (ST3130), and the SAM 2100 responds to the request by transmitting such a function control signal to the reader RF control unit 2300 (ST3140).

The reader RF control unit 2300 wirelessly transmits the function control signal to the mobile terminal 1000 in the NFC manner, thereby transmitting the function control signal to the NFC controller 1100 (ST3150).

The NFC controller 1100 of the mobile terminal 1000 analyzes the function control signal and notifies the base band unit 1300 of the analyzed function control signal, and the base band unit 1300 records and executes the function control signal, and, at the same time, notifies the NFC controller 1100 of the results of the execution, so that the NFC controller 1100 confirms the corresponding results (ST3160).

The NFC controller 1100 reports the results of the execution of the function control signal to the reader 2000, thereby reporting the results of the execution of the function control signal to the reader RF control unit 2300 (ST3170).

Figure 9:
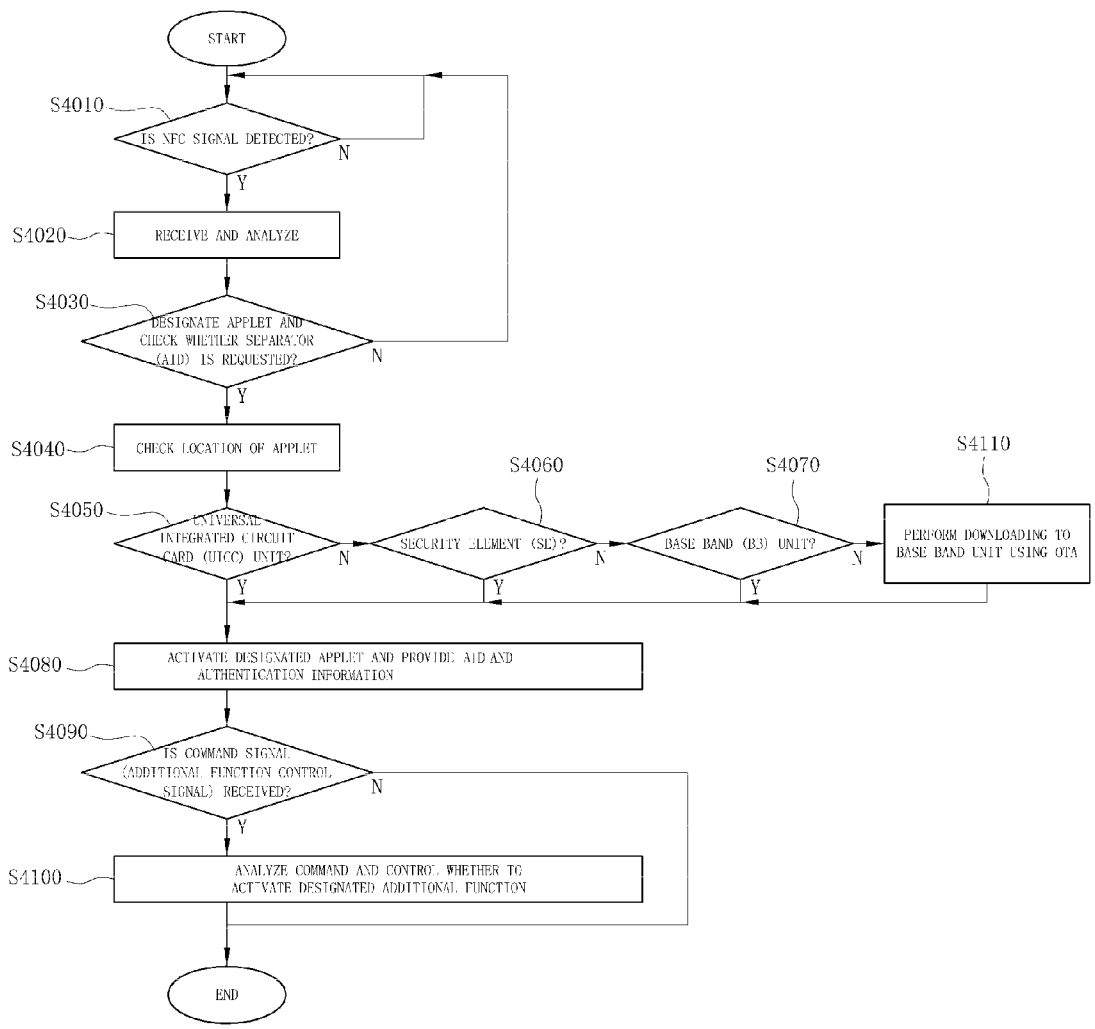
FIG. 9 is a flowchart illustrating a method of controlling the mobile terminal according to the first embodiment of the present invention.

FIG. 9 is a flowchart illustrating a method of controlling the mobile terminal according to an embodiment of the present invention.

Referring to FIG. 9, if the base band unit for monitoring each of the functional units of the mobile terminal and processing a base band signal checks if the NFC controller has detected an NFC signal (S4010), if so, the base band unit controls the NFC controller so that the NFC controller receives and analyzes the corresponding function control signal and receives the analyzed signal from the NFC controller (S4020).

The base band unit checks the received function control signal and designates a card mode applet to be activated. At the same time, if the function control signal is analyzed as a function control signal used to request AID (S4030), the base band unit checks a location where the designated applet has been recorded (S4040).

Here, the designated card mode applet is an applet for activating one or more functions selected from among a plurality of functions of the mobile terminal, and, for example, will be recorded in the base band unit according to the first embodiment.

The base band unit searches the UICC unit and checks whether the designated card mode applet has been recorded (S4050). When the designated card mode applet has not been recorded in the UICC unit, the base band unit searches the SE (S4060). When the designated card mode applet has not been recorded in the SE, the base band unit searches the base band unit (S4070).

Here, when the designated card mode applet is not found in any of the UICC unit, the SE and the base band unit by the base band unit, the designated card mode applet is wirelessly downloaded from the reader 2000 using an OTA method and recorded in the allocated region of the memory included in the base band unit (S4110).

After checking the location of the designated card mode applet, the base band unit activates the designated applet and provides the found AID and authentication information to the reader (S4080).

The base band unit checks whether a function control signal used to control the activation of the function selected from among functions of the mobile terminal has been received from the reader (S4090).

If the function control signal has been received, the base band unit receives the function control signal from the NFC controller, and performs control such that the function designated by the function control signal is turned on or off (S4100).

Here, it is preferable that the corresponding function, which has been controlled such that the function is turned off when the security region is entered, be restored to the original state, that is, the corresponding function should be turned on when the security region is left.

According to the configuration of embodiments of the present invention, a function control signal used to control a function, which is designated and selected from among a plurality of functions provided to a mobile terminal such that the function is turned on or off, is wirelessly received from a reader using an NFC method, and is processed by the base band unit.

Since a location where an applet has been recorded is checked and activated by the base band unit, there is an advantage in that all of the operations of a mobile terminal are unified and rapidly and correctly controlled.

According to the present invention having the above-described configuration, a mobile terminal located in a set security region is connected using the NFC method, and the operation of one or more functions selected from among a plurality of functions provided to the mobile terminal is compulsorily controlled, so that there are advantages in that, for example, a ring tone is not activated in a place where silence is required and that image capturing, recording, scanning, and mobile communication are automatically controlled in a place where information security is required.

Further, according to the embodiments of the present invention having the above-described configuration, a mobile terminal which enters/exit a security region is connected using the NFC method, and the operation of one or more selected functions is automatically and compulsorily controlled, so that there is the advantages of operating, maintaining, and managing the security with a small number of people and low costs.

Further, according to the embodiments of the present invention having the above-described configuration, the operation of the selected function is automatically controlled while the existing configuration of a mobile terminal is used without change, so that there are the advantages of simplifying the configuration of a mobile terminal, reducing the price of the mobile terminal, and easily manufacturing and producing a mobile terminal, thereby increasing the productivity.

Meanwhile, according to the embodiments of the present invention having the above-described configuration, the operation of at least one designated functions of a mobile terminal which is entered a security region is compulsorily controlled, and the controlled function is automatically returned to an original state when the mobile terminal is left from the security region, so that there is an advantage of maintaining security.

Further, according to the embodiments of the present invention having the above-described configuration, a location where a smart card application is recorded is checked by an AID and the smart card application is activated, so that there is the advantage of an electronic payment service being rapidly and correctly processed in the mobile terminal.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile terminal with a Near Field Communication (NFC) function, the mobile terminal wirelessly connecting to a reader using an NFC method, comprising:
    an NFC controller to wirelessly connect to the reader through an NFC antenna and to receive an Applet Identification (AID) signal and a function control signal used to control operational states of a plurality of functions provided to the mobile terminal from the reader;
    a base band unit to receive the function control signal and control the operational states of at least one function selected from among the plurality of functions provided to and operated in the mobile terminal;
    a Universal Integrated Circuit Card (UICC) unit to connect to the NFC controller and record information about a subscriber of the mobile terminal; and
    a Secure Element (SE) to encode and decode the signal transmitted and received between the mobile terminal and the reader, using a security algorithm,
    wherein the base band unit comprises:
        a card applet unit for setting an applet corresponding to the Applet Identification (AID) received from the reader by the NFC controller to an active state, receiving the function control signal, and converting the function control signal into a decoded function control signal by decoding an encryption code; and
        a function control unit for controlling the operational states of the functions designated based on the function control signal decoded and transmitted by the card applet unit.

2. The mobile terminal as set forth in claim 1, wherein the NFC controller checks a location in which an applet has been recorded using the AID, activates the applet corresponding to the checked location, encodes the received function control signal, and transmits the encoded function control signal to the activated applet.

3. The mobile terminal as set forth in claim 1, wherein the base band unit comprises a function control unit to control the operational states of the functions designated based on the function control signal decoded and transmitted from the NFC controller; and
    the UICC unit comprises a card applet unit to set an applet recorded to an active state under a control of the NFC controller, receive the function control signal, and convert the function control signal into a decoded function control signal by decoding an encryption code.

4. A mobile terminal with an NFC function, the mobile terminal wirelessly connecting to a reader using an NFC method, comprising, an NFC controller to wirelessly connect to the reader through an NFC antenna, and to receive an Applet Identification (AID) signal and a function control signal used to control operational states of a plurality of functions provided to the mobile terminal from the reader;
   a base band unit to receive the function control signal, and control the operational states of at least one function selected from among the plurality of functions provided to and operated in the mobile terminal;
   a Universal Integrated Circuit Card (UICC) unit to connect to the NFC controller and record information about a subscriber of the mobile terminal; and
   a Secure Element (SE) to encode and decode the signal transmitted and received between the mobile terminal and the reader, using a security algorithm; and
   a function control unit to control the operational states of the functions designated based on the function control signal decoded and transmitted from the NFC controller;
   wherein the SE comprises a card applet unit to set an applet recorded under a control of the NFC controller in an active state, receive the function control signal, and convert the function control signal into a decoded function control signal by decoding an encryption code.

5. A mobile terminal with an NFC function, the mobile terminal wirelessly connecting to a reader using an NFC method, comprising an NFC controller to wirelessly connect to the reader through an NFC antenna, and receive an Applet Identification (AID) signal and a function control signal used to control operational states of a plurality of functions provided to the mobile terminal from the reader;
a base band unit for receiving the function control signal, and controlling operational states of one or more functions selected from among the plurality of functions provided to and operated in the mobile terminal; and
a Universal Integrated Circuit Card (UICC) unit for connecting to the NFC controller and recording information about a subscriber of the mobile terminal
wherein the NFC controller comprises an SE for encoding and decoding the signal, which is transmitted and received between the mobile terminal and the reader, using a security algorithm; and
the SE comprises a card applet unit for setting an applet recorded under a control of the NFC controller in an active state, receiving the function control signal, and converting the function control signal into a decoded function control signal by decoding an encryption code.

\* \* \* \* \*